United States Patent
Liu et al.

(10) Patent No.: US 12,286,723 B2
(45) Date of Patent: Apr. 29, 2025

(54) POST-PLATING TREATMENT METHOD FOR ONE-STEP BRASS-ELECTROPLATED STEEL WIRE

(71) Applicant: Jiangsu Xingda Steel Tyre Cord Co., Ltd., Jiangsu (CN)

(72) Inventors: Xiang Liu, Jiangsu (CN); Na Li, Jiangsu (CN); Weigang Miao, Jiangsu (CN); Lili Yao, Jiangsu (CN); Xianghui Liu, Jiangsu (CN); Xin Hua, Jiangsu (CN); Yubo Wei, Jiangsu (CN); Chenlu Zhu, Jiangsu (CN)

(73) Assignee: Jiangsu Xingda Steel Tyre Cord Co., Ltd. (CN)

( * ) Notice: Subject to any disclaimer, the term of this patent is extended or adjusted under 35 U.S.C. 154(b) by 133 days.

(21) Appl. No.: 17/999,847

(22) PCT Filed: May 28, 2021

(86) PCT No.: PCT/CN2021/096682
§ 371 (c)(1),
(2) Date: Nov. 24, 2022

(87) PCT Pub. No.: WO2022/007534
PCT Pub. Date: Jan. 13, 2022

(65) Prior Publication Data
US 2023/0212774 A1    Jul. 6, 2023

(30) Foreign Application Priority Data
Jul. 9, 2020 (CN) .......... 202010657232.X

(51) Int. Cl.
*C25D 5/48* (2006.01)
*C25D 7/06* (2006.01)

(52) U.S. Cl.
CPC .......... *C25D 5/48* (2013.01); *C25D 7/0607* (2013.01)

(58) Field of Classification Search
None
See application file for complete search history.

(56) References Cited

U.S. PATENT DOCUMENTS

| 4,269,645 A * | 5/1981 | Shemenski, Sr. | C08J 5/06 152/565 |
| 4,390,377 A * | 6/1983 | Hogg | C25D 5/48 205/228 |
| 2012/0177944 A1* | 7/2012 | Toyosawa | C08K 7/02 428/681 |

OTHER PUBLICATIONS

English translation CN 106944583 (Year: 2017).*

(Continued)

*Primary Examiner* — Stefanie S Wittenberg

(57) ABSTRACT

Disclosed is a post-plating treatment method for a one-step brass-electroplated steel wire, comprising the following steps: electroplating the surface of the steel wire with a brass alloy; immediately washing the electroplated steel wire with cold water, removing residues from the surface of the steel wire, and blow-drying the steel wire with cold air; immersing the blow-dried steel wire in a water-based coating solution; and taking the immersed steel wire out, blow-drying the steel wire with natural air, and taking the steel wire up. The water-based coating solution comprises a polyoxyethylene organic salt, sodium hypophosphite and the balance of pure water, the polyoxyethylene organic salt comprising a salt of alkyl polyoxyethylene ether phosphate and polyoxyethylene alkylamine.

5 Claims, 1 Drawing Sheet

(56) References Cited

OTHER PUBLICATIONS

English translation CN 106350190 (Year: 2016).*
English translation JP 2018119242 (Year: 2018).*
CN 104120462 (Year: Oct. 2014).*

* cited by examiner

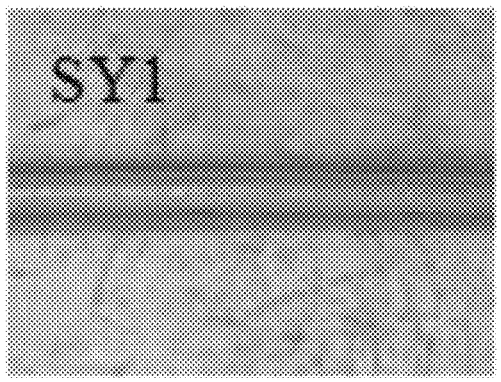
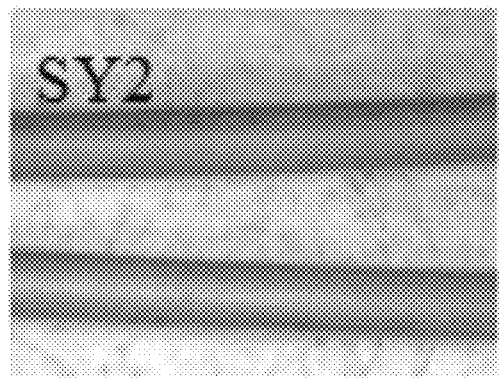
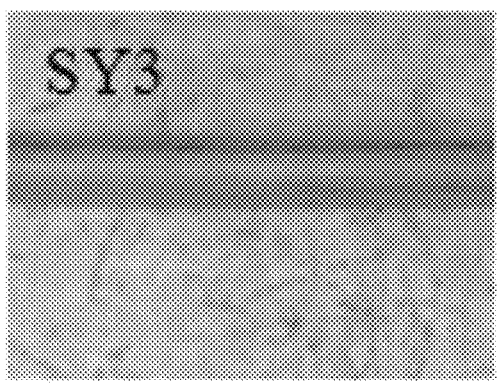
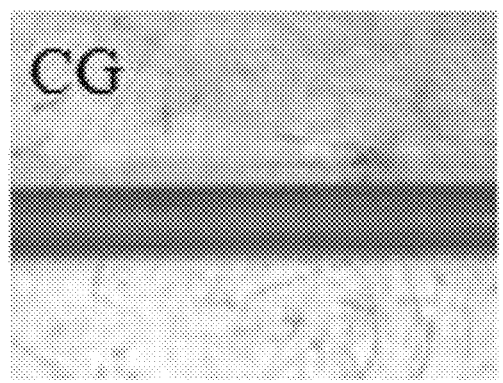

POST-PLATING TREATMENT METHOD FOR ONE-STEP BRASS-ELECTROPLATED STEEL WIRE

FIELD OF THE INVENTION

The invention relates to a post-plating treatment method for a one-step brass-electroplated steel wire, belonging to the technical field of surface treatment for brass coating of electroplated steel wires.

BACKGROUND OF THE INVENTION

Brass is a metal alloy with a bright surface, good ductility and adhesion to rubber, but poor corrosion resistance, and the surface is likely to corrode and oxidize to lose its original color, thereby losing the unique physical and chemical properties of brass, which is unfavorable for the subsequent drawing and bonding of the steel wire. Therefore, it is required to treat the surface to achieve certain oxidation resistance and corrosion resistance.

The conventional domestic electroplating line operates in such a way that copper plating is carried out prior to galvanizing, the brass alloy phase is formed by intermediate frequency thermal diffusion, and then the phosphating-soap dipping surface treatment process is carried out to obtain the brass coating. The process flow is long, and the intermediate frequency thermal diffusion process generates huge energy consumption, and the treatment of phosphorus-containing wastewater produced by phosphating is expensive and not conducive to environmental protection. One-step brass electroplating technology has been developed in the prior art, but the coating surface treatment process of thermal diffusion electroplating, i.e., phosphating-soap dipping process, does not match the one-step brass electroplating technology. Because the one-step electroplating steel wire production process does not involve thermal diffusion, the surface treatment by the phosphating-soap process is not required. If the existing process is still used, the proportion of copper and zinc in the brass coating of the steel wire will be unbalanced, thereby affecting the use of the subsequent process. Therefore, it is desired to develop a post-plating treatment technology suitable for the one-step electroplating technology.

After brass plating in the conventional one-step process, the process steps of passivation, water washing and drying are required to ensure that the coating surface of the steel wire has a certain oxidation resistance and corrosion resistance and the surface oxide content meets the drawing and twisting requirements of the subsequent process. The conventional passivation process has the best effect by using chromate, but the use of chromate, which is toxic, violates relevant environmental protection regulations and the treatment process of chromate is relatively complicated.

SUMMARY OF THE INVENTION

The technical problem to be solved by the invention is to overcome the defects of the prior art and to provide a post-plating treatment method for a one-step brass-electroplated steel wire that can avoid the process steps of passivation, water washing and drying and simplify technological process, and also has an environmentally friendly processing process.

In order to solve the above technical problem, the technical solution of the invention is as follows:

A post-plating treatment method for a one-step brass-electroplated steel wire, comprising the following steps:
electroplating the surface of the steel wire with a brass alloy;
immediately washing the electroplated steel wire with cold water, removing residue from the surface of the steel wire, and blow-drying the steel wire with cold air;
immersing the blow-dried steel wire in a water-based coating solution; and
taking the immersed steel wire out, blow-drying the steel wire with natural air, and taking the steel wire up.

The water-based coating solution comprises a polyoxyethylene organic salt, sodium hypophosphite and the balance of pure water.

The polyoxyethylene organic salt comprises a salt of alkyl polyoxyethylene ether phosphate and polyoxyethylene alkylamine.

The salt of alkyl polyoxyethylene ether phosphate is one of a potassium salt of alkyl polyoxyethylene ether phosphate, a sodium salt of alkyl polyoxyethylene ether phosphate and triethanolamine.

By weight, provided are total 100 parts of the water-based coating solution, comprising 5-10 parts of the polyoxyethylene organic salt, 0.5-2 parts of sodium hypophosphite and the balance of pure water.

The 5-10 parts of the polyoxyethylene organic salt comprise 0.5-2 parts of polyoxyethylene alkylamine and the balance of the salt of alkyl polyoxyethylene ether phosphate.

The steel wire is immersed in the water-based coating solution for 4±1 s.

The water-based coating solution has a pH value of 8±0.3 and a temperature of 65-85° C.

Beneficial effects of the invention: the invention provides a post-plating treatment method for a one-step brass-electroplated steel wire, with reasonable design, simple process, safety and environmental friendliness. Compared with the conventional thermal diffusion electroplating process, the invention simplifies the technological process by omitting the phosphating and soaping process steps and can ensure that the steel wire prepared can be directly taken up for drawing of the subsequent process without undergoing water washing, drying and other pretreatment processes on the surface. The organic salt in the water-based coating solution is polyoxyethylene. Since polyoxyethylene is a hydrophilic group and the surface tension of an aqueous solution containing this group decreases with the increase of temperature, the water-based coating solution of the invention has better water solubility and dispersibility, and is more uniformly applied to the surface of the steel wire. The introduction of phosphorus-containing groups and amine groups enables the coating solution of the invention to have certain anti-rust and lubricating effects, and adding a small amount of sodium phosphite can further improve the anti-rust performance of the invention. The coating of the treated steel wire is better than that of the conventional steel wire in corrosion resistance. In addition, the water-based coating solution has no adverse effect on the wet drawing lubricant, and can be directly used for the wet drawing in production of steel cords or hose steel wires.

BRIEF DESCRIPTION OF DRAWINGS

FIG. 1 shows the three-day 80° C./80% damp-heat aging comparison between the brass-electroplated steel wires according to embodiments of the invention and the conventional steel wire.

DETAILED DESCRIPTION OF THE INVENTION

The invention will be further described below with reference to the accompanying drawings. The following embodiments are only used to more clearly illustrate the technical solutions of the invention, rather than limiting the scope of the invention.

Example 1

4.5 parts of potassium alkyl polyoxyethylene ether phosphate, 0.5 part of polyoxyethylene alkyl amine, 0.5 part of sodium phosphite and pure water were mixed to obtain 100 parts of a water-based coating solution, the pH of the water-based coating solution was adjusted to 7.7 with KOH, and the coating solution was then heated to 65° C. The one-step brass-electroplated steel wire was washed with water and then passed through the coating solution immediately with a residence time of 4 s, and the wire was then taken up. Part of the steel wire was taken as the sample SY1 for the 80° C./80% damp-heat aging test and the surface ZnO content aging test to verify the corrosion resistance of the coating surface of the steel wire.

Example 2

6 parts of potassium alkyl polyoxyethylene ether phosphate, 1.2 parts of polyoxyethylene alkyl amine, 1.2 parts of sodium phosphite and pure water were mixed to obtain 100 parts of a water-based coating solution, the pH of the water-based coating solution was adjusted to 8.0 with KOH, and the coating solution was then heated to 75° C. The one-step brass-electroplated steel wire was washed with water and then passed through the coating solution immediately with a residence time of 4 s, and the wire was then taken up. Part of the steel wire was taken as the sample SY2 for the 80° C./80% damp-heat aging test and the surface ZnO content aging test to verify the corrosion resistance of the coating surface of the steel wire.

Example 3

8 parts of potassium alkyl polyoxyethylene ether phosphate, 2 parts of polyoxyethylene alkyl amine, 2 parts of sodium phosphite and pure water were mixed to obtain 100 parts of a water-based coating solution, the pH of the water-based coating solution was adjusted to 8.0 with KOH, and the coating solution was then heated to 85° C. The one-step brass-electroplated steel wire was washed with water and then passed through the coating solution immediately with a residence time of 4 s, and the wire was then taken up. Part of the steel wire was taken as the sample SY3 for the 80° C./80% damp-heat aging test and the surface ZnO content aging test to verify the corrosion resistance of the coating surface of the steel wire.

Comparative Example 4

15 parts of potassium alkyl polyoxyethylene ether phosphate, 5 parts of polyoxyethylene alkyl amine, 5 parts of sodium phosphite and pure water were mixed to obtain 100 parts of a water-based coating solution, the pH of the water-based coating solution was adjusted to 8.0 with KOH, and the coating solution was then heated to 80° C. The one-step electroplated-brass steel wire was washed with water and passed through the coating solution immediately with a residence time of 4 s, and the steel wire was then taken up. Since the concentration was too high, the surface of the steel wire was not easy to dry, and the coating was thick, which is not conducive to the use for subsequent drawing.

Comparative Example 5

6 parts of potassium alkyl polyoxyethylene ether phosphate, 1.2 parts of polyoxyethylene alkyl amine, 1.2 parts of sodium phosphite and pure water were mixed to obtain 100 parts of a water-based coating solution, the pH of the water-based coating solution was adjusted to 8.0 with KOH, and the coating solution was then heated to 55° C. The one-step electroplated-brass steel wire was washed with water and passed through the coating solution immediately with a residence time of 4 s, and the steel wire was then taken up. Since the temperature was too low, the surface of the steel wire was not easy to dry.

Comparative Example 6

6 parts of potassium alkyl polyoxyethylene ether phosphate, 1.2 parts of polyoxyethylene alkyl amine, 1.2 parts of sodium phosphite and pure water were mixed to obtain 100 parts of a water-based coating solution, the pH of the water-based coating solution was adjusted to 8.0 with KOH, and the coating solution was then heated to 80° C. The one-step electroplated-brass steel wire was washed with water and passed through the coating solution immediately with a residence time of 6 s, and the steel wire was then taken up. Since the treatment was too long and the surface coating of the steel wire was too thick, the surface of the steel wire was not easy to dry.

Comparative Example 7

Part of the conventional thermal diffusion brass-electroplated steel wire in the same period was taken as the sample CG for the 80° C./80% damp-heat aging test and the surface ZnO content aging test to compare with the steel wire of the invention patent in terms of the corrosion resistance of the coating surface.

FIG. 1 shows the three-day 80° C./80% damp-heat aging comparison between the brass steel wires according to the examples of the invention and the conventional steel wire. SY1, SY2, and SY3 are the steel wires treated according to Examples 1 to 3 of the invention, respectively, and CG is a conventional steel wire. It can be seen that the surface of the brass-electroplated steel wire treated according to the invention becomes dark without large rust spots after three days of damp-heat aging, while the surface coating of the conventional steel wire has rust and becomes back. Table 1 shows the surface ZnO content data of the brass-electroplated steel wires obtained according to the examples and the conventional steel wire tracked for a period of 2 months. As can be seen from Table 1, compared with the conventional steel wire, the brass-electroplated steel wire obtained according to the invention has lower surface ZnO content and slower surface oxidation and the requirements of wet drawing for the surface ZnO content of the brass-electroplated steel wire can be met.

TABLE 1

Surface ZnO contents of the brass-electroplated steel wires of the invention and the conventional steel wire

| Sample No. | Surface ZnO content (mg/m$^2$) | |
|---|---|---|
| | 1 day | 60 days |
| SY1 | 24.6 | 54.8 |
| SY2 | 18.2 | 45.6 |
| SY3 | 23.5 | 49.3 |
| CG | 32.9 | 58.3 |

The above are only the preferred embodiments of the invention. It should be pointed out that for those skilled in the art, without departing from the principles of the invention, several improvements and modifications can also be made, and these improvements and modifications should also be regarded as falling within the scope of the invention.

The invention claimed is:

1. A post-plating treatment method for a one-step brass-electroplated steel wire, comprising the following steps:
    electroplating the surface of the steel wire with a brass alloy;
    immediately washing the electroplated steel wire with cold water, removing residue from the surface of the steel wire, and blow-drying the steel wire with cold air;
    immersing the blow-dried steel wire in a water-based coating solution for 3-5 s to improve anti-rust performance of the surface of the steel wire; and
    taking the immersed steel wire out, blow-drying the steel wire with natural air, and taking the steel wire up; wherein,
    the water-based coating solution has a pH value of 7.7-8.3 and a temperature of 65-85° C. and the water-based coating solution comprises a polyoxyethylene organic salt and sodium hypophosphite and the balance of pure water.

2. The post-plating treatment method for a one-step brass-electroplated steel wire according to claim 1, wherein,
    the polyoxyethylene organic salt comprises a salt of alkyl polyoxyethylene ether phosphate and polyoxyethylene alkylamine.

3. The post-plating treatment method for a one-step brass-electroplated steel wire according to claim 2, wherein,
    the salt of alkyl polyoxyethylene ether phosphate is one of a potassium salt of alkyl polyoxyethylene ether phosphate, a sodium salt of alkyl polyoxyethylene ether phosphate and triethanolamine.

4. The post-plating treatment method for a one-step brass-electroplated steel wire according to claim 2, wherein,
    by weight, provided are total 100 parts of the water-based coating solution, comprising 5-10 parts of the polyoxyethylene organic salt, 0.5-2 parts of sodium hypophosphite and the balance of pure water.

5. The post-plating treatment method for a one-step brass-electroplated steel wire according to claim 4, wherein,
    the 5-10 parts of the polyoxyethylene organic salt comprise 0.5-2 parts of polyoxyethylene alkylamine and the balance of the salt of alkyl polyoxyethylene ether phosphate.

* * * * *